United States Patent
Aono et al.

[11] Patent Number: 5,936,633
[45] Date of Patent: Aug. 10, 1999

[54] RENDERING METHOD AND APPARATUS, AND METHOD AND APPARATUS FOR SMOOTHING INTENSITY-VALUE

[75] Inventors: Masaki Aono; Ryutarou Ohbuchi, both of Yokohama; Shigeo Murohashi, Tokyo, all of Japan

[73] Assignee: International Business Machines Corporation, Armonk, N.Y.

[21] Appl. No.: 08/898,750

[22] Filed: Jul. 23, 1997

[30] Foreign Application Priority Data

Jul. 23, 1996 [JP] Japan ............................ 8-193752

[51] Int. Cl.⁶ .................................................. G06T 5/20
[52] U.S. Cl. ................................................ 345/432
[58] Field of Search ........................ 345/429, 430, 345/431, 432, 418, 136, 147, 138

[56] References Cited

U.S. PATENT DOCUMENTS

| | | | |
|---|---|---|---|
| 5,394,518 | 2/1995 | Friedman et al. | 395/131 |
| 5,444,832 | 8/1995 | Suzuki | 395/132 |
| 5,598,185 | 1/1997 | Holmgren | 345/431 |
| 5,649,083 | 7/1997 | Barkans et al. | 345/431 |
| 5,781,176 | 7/1998 | Rey et al. | 345/147 |

*Primary Examiner*—Phu K. Nguyen
*Assistant Examiner*—Cliff N. Vo
*Attorney, Agent, or Firm*—Ronald L. Drumheller

[57] ABSTRACT

In order to render a three-dimensional space which has a spotlight source with a cone angle $\theta$ at high speed and with better quality, an object's surface in the three-dimensional space is first meshed into a plurality of elements. Then, a radiosity from the spotlight source is calculated for each element which is included inside of the cone angle $\theta$ when viewed from the spotlight source. Thereafter, an intensity-value at each vertex of each element is calculated from the radiosity calculated for each element. Next, Gouraud shading is performed by using the intensity-value at each vertex of each element, and the result is displayed on a display.

37 Claims, 13 Drawing Sheets

RENDERING METHOD AND APPARATUS, AND METHOD AND APPARATUS FOR SMOOTHING INTENSITY-VALUE

BACKGROUND OF THE INVENTION

1. Field of the Invention

The present invention relates to computer graphics, and more particularly to a geometric preprocessor for Gouraud-shading a spotlight and to the intensity-value smoothing of a scene having a boundary where a difference between intensity-values becomes large, such as the spotlight.

2. Related Art

Many of the graphic accelerators, which is hardware, and the Open GL (trademark of Silicon Graphics Inc.) of a graphic API (application program interface) being now most extensively used provide the Gouraud shading as a rendering function. The Gouraud shading is a shading method where an intensity-value (e.g., an intensity-value including data representative of the strength of each of red, green, and blue) is calculated at each vertex of geometric data (object) and then the intensity-value at each vertex is linearly interpolated, thereby approximating an intensity-value at an arbitrary point in the geometric data. (For a more detailed discussion on the Gouraud shading, see H. Gouraud, "Computer Display of Curved Surfaces," Ph.D. Dissertation, University of Utah, UTEC-CSs-71-113, 1971) Point light sources, parallel light rays, and spotlight are now being standardized as the supported kind of a light source in the graphic API, including the aforementioned Open GL. However, hitherto the spotlight has not been simulated in Gouraud shading, unless it is specially processed.

This results from the fact that, if the vertices of a geometrical figure on which the light from a spotlight source is irradiated are not inside of the cone angle of the spotlight, the intensity-values on the vertices will become zero and the intensity-values interpolated at points in the geometrical figure will also become zero. For instance, consider the situation where a spotlight is hung from the ceiling of a room and rendered by Gouraud shading. When the floor is constructed from a plate, which is flat geometrically, the area which is irradiated by the spotlight is included completely inside of the flat plate. If another light source does not exist, the screen will become black. In order to avoid a phenomenon such as this, there has hitherto been employed a method where original data is suitably meshed into small elements and then Gouraud shading is performed again. However, even if processing such as this were performed, the part illuminated by spotlight would not become a circular arc shape which is the original shape.

Now, the general concept of a spotlight source will be described. The spotlight source is a sort of standard point light source normally supported by many renderers and graphic APIs (e.g., PHIGS+, Open GL, VRML, Renderman) and is limited on the direction of irradiation. More accurately, the spotlight source is a point light source such as irradiating only objects which are contained inside of a cone where the light source is the vertex of the cone and the irradiation direction is the center axis of the cone. In practice, the spotlight generally has such a property that, even when an object is inside of a cone space where the spotlight is irradiated, the intensity-value of irradiated light is attenuated in proportion to an exponent of a cosine of an angle formed with the center axis, as the object or a point in the object goes away from the center of the cone. FIG. 1 shows a schematic view of a spotlight. Excluding color and intensity parameters, the spotlight is represented by five parameters, that is, four parameters shown in the figure and a beam distribution parameter indicating the degree of attenuation when the object or a point in the object goes away from the center axis. That is, the spotlight is expressed by the following parameters:

1. from (start point)
2. to (end point)
3. coneangle (cone angle)
4. conedeltaangle (delta angle)
5. beamdistribution (degree of attenuation)

If, as shown in FIG. 1, it is assumed that the degree of attenuation of spotlight is $\alpha$, the cone angle is $\theta$, the delta angle is $\delta$, the directional vector from a start point to an end point is A, the directional vector from a start point to an arbitrary point inside of the cone angle is L, the spotlight is white, and the intensity is 1, the intensity I at a point w will be given by the following equation.

$$I = x \text{ smoothstep } (\cos \theta, \cos (\theta-\delta), x) \quad (1)$$

where $x=(L \cdot A)^{\alpha}$ and the smoothstep (a, b, c) is given by the following Equation 1.

[Equation 1]

$$\text{smoothstep}(a, b, x) = \begin{cases} 0.0 & \text{if } x < a \\ 1.0 & \text{if } x > b \\ \text{hermite}(1.0 - (x-a)/(b-a)) & \text{otherwise} \end{cases}$$

In Equation 1, hermite $(x)=2x^3-3x^2+1$. The smoothstep (a, b, x) is shown in FIG. 2.

The delta angle $\delta$ is used for grading a circular edge which forms the boundary of an area irradiated by the spotlight. In practice, when an angle which a point on the irradiated surface makes with the center axis of the spotlight is between $\theta-\delta$ and $\theta$, the former is taken to be 1.0 and the latter is taken to be 0.0. The intention of the delta angle is to smoothly interpolate the angle between $\theta-\delta$ and $\theta$. $\delta$ normally takes a value in the range of $0 \leq \delta \leq \theta$. When $\theta=0$, the aforementioned function of smoothstep results in a discontinuous normal step function with $a=b=\cos \theta$. Therefore, a clear boundary is drawn.

The point that the spotlight most differs from other standard light sources (e.g., point light sources and parallel light beams) is that a considerable difference in light and shade occurs in the boundary between a spotlight-irradiated portion and an unirradiated portion, even when there is no screening relationship between an object in space and a given light source. Sometimes, this property of the spotlight is utilized positively. For example, in the case of a renderer which cannot perform a shading process, a plurality of sets of spotlight beams are used to enhance quality. Also, the property of the spotlight is often used for enhancing the rendering process speed which tends to be slow in the case of a plurality of point light sources. However, Phong shading, not Gouraud shading which incidentally is often supported by hardware, is indispensable for accurately expressing the feeling of the spotlight.

The Phong shading is a shading method where, from a normal vector given at each vertex of geometrical data (object), a normal vector at an arbitrary point in the geometrical data is linearly interpolated and, based on the linearly interpolated normal vector, intensity calculation is performed again (B-T. Phong, "Illumination for Computer-Generated Images," Ph.D. Dissertation, University of Utah, UTEC-CSs-73-129, 1973). The Phong shading has the advantage that the local reflection state of illumination, such as highlight, can be modeled with fidelity, but, on the other hand, it has the disadvantage that it is difficult to make with hardware and an intensity-value must be calculated at each vertex and therefore the processing speed is slow.

Thus, an additional method is needed for performing Gouraud shading of the spotlight without damaging the quality. The method which has been most used is to give small meshes in advance, as described above. Even in this case there is the possibility that aliasing will occur near a boundary whose intensity change is large (Aikawa, "Open GL Programming Guide," Gijyutsu Hyoron-sha, Effect of Spotlight, FIGS. 5–13, p. 87, 1995). As another method, "projection texture" is used (M. Segel, et al., "Fast Shadows and Lighting Effects Using Texture Mapping," Proc. SIGGRAPH'92, 249–252, 1992). This method has the characteristic that the spotlight can be simulated at high speeds by using texture mapping without damaging the quality and under hardware support. However, unless a graphic accelerator supporting texture mapping by hardware exists, the aforementioned method is not practical because it requires a large capacity storage and is expensive.

As a similar method, an approach using reflection mapping has been proposed in order to alleviate aliasing caused by a difference in light and shade which occurs due to highlight (D. Voorhies and J. Foran, "Reflection Vector Shading Hardware," Proc. SIGGRAPH'94, 163–166, 1994). This method can satisfactorily cope with aliasing which occurs due to a difference in light and shade around highlight. However, the reflection mapping is realized by originally mapping a hemispherical (or whole spherical) space, such as the celestial sphere, on an object, so the reflection mapping is effective only for an object itself which is spherical in shape. In general, no reflection mapping effects will arise in flat objects. Furthermore, in the case where reflection mapping is performed for all objects in a scene, a large capacity storage area is required and the performance is also reduced extremely.

Published Unexamined Patent Application (PUPA) No. 3-296178 discloses a unit which includes overlap judging means for judging whether or not an irradiated region of each spotlight source and each surface of an output object overlap each other when Gouraud shading is performed, overlap region generating means for obtaining each of the overlapped surfaces of the output object and an overlapped region in the overlapped surfaces, based on a result of the judgment of the overlap judging means, and region segmenting means for segmenting the obtained overlapped region obtained with the overlapped surface into polygons and giving them to intensity calculating means. When the overlapped region is obtained in the aforementioned way, the irradiated region of a spotlight source is normally a circular arc and therefore is expressed with a quadric. With this function and a function expressing an irradiated surface, a crossed line is obtained, so a considerable amount of calculation is required. If an irradiated surface is a quadric, the same amount as an amount of calculation of a function of the degree four will be required and performance will become worse. In addition, the aforementioned publication shows an embodiment where an overlapped surface is detected and then the overlapped surface is segmented into small areas, however, this is an idea which does not differ from the aforementioned method that small meshes are given in advance.

As described above, there is no conventional method which can effectively handle a spotlight source by the Gouraud shading.

Now, a radiosity method will be described from the relation with the present invention.

The radiosity method is one of the rendering methods based on a global illumination model and is a method where the intensity of an object is calculated on the assumption that incident light is perfectly diffused and reflected at all surfaces of the object. FIG. 3 is a diagram showing the geometrical relation between a point $X_i$ on a certain surface $A_i$ and a point $X_j$ on another surface $A_j$. When the areas of the respective surface elements are sufficiently small in the aforementioned positional relation, the rate of photons emerging from the small surface $dA_i$ and arriving at the small surface $dA_j$ depends upon only the geometrical position relation. This rate is called a form factor ($F_{ij}$) and represented by the following Equation 2.

[Equation 2]

$$F_{ij} = \frac{1}{A_i} \int_{A_i} \int_{A_j} \frac{\cos\phi_i \cos\phi_j}{\pi r^2} V_{ij} dA_j dA_i$$

In Equation 2, r is the distance between the small surfaces $dA_i$ and $dA_j$ and $V_{ij}$ is a flag which indicates whether $dA_j$ is seen from $dA_i$. When $dA_j$ is seen, the flag is 1, and when $dA_j$ is not seen, the flag is 0.

In general, the radiosity $B_i$, emitted from the small surface dAi, is expressed by the following Equation 3 from self-radiation $E_i$, reflectance factor $\rho_i$ that is the rate at which the radiosity $B_j$ from another small surface (in this embodiment, j=1 through N) is reflected, and form factor $F_{ij}$ that is the rate at which photons arrive at the small surface $dA_j$.

[Equation 3]

$$B_i = E_i + \rho_i \sum_{j=1}^{N} B_j F_{ij}$$

If Equation 3 is solved for all radiosities Bi, the radiosities for all small surfaces will be obtained. In Equation 3 the self-radiation $E_i$ and the reflectance factor $\rho_i$ (this represents the color of an element to which the beams are emitted.) are set values. Therefore, if the form factors $F_{ij}$ between all geometrical elements are obtained, the radiosities can be calculated. In FIG. 3, if it is assumed that the surface $A_i$ is a light source, it will be found that a surface light source can be naturally handled in the radiosity method.

However, generally the calculation of the form factor given by Equation 2 cannot be solved analytically. Many of the conventional theses on the radiosity method discuss as to how the form factor is obtained with high efficiency and less errors. For example, Hemi-cube (M. Cohen et al., "The hemi-cube: A radiosity solution for complex environment," Proc. SIGGRAPH'85, 31–40, 1985) and Nusselt Analog (M. Cohen and J. R. Wallance, "Radiosity and Realistic Image Synthesis," Academic Press Professional, Cambridge, Mass. 1933 and A. Doi,"Bidirectional Radiosity Approach for Complex Environments," Denshi Tokyo, IEEE Tokyo Section, No. 32, 93–99, 1933) are known as very famous methods.

Here the Nusselt Analog relating to the present invention will briefly be described. As shown in FIG. 4, when two geometrical elements $A_i$ and $A_j$ are present and $A_j$ is a light source, the center of a unit hemisphere is put to a point $X_i$ in the element $A_i$. The normal at this point $X_i$ is taken just above the unit hemisphere. Then, the element $A_j$ is projected on the unit hemisphere and its image is mapped onto the bottom surface of the unit hemisphere. The property that the mapped area on the bottom surface of the unit hemisphere becomes equal to the form factor $F_{ij}$ (exactly speaking, $\pi F_{ij} A_i$) is employed. Then, by placing a Z buffer, which is often used in hidden-surface processing, on the bottom surface of the unit hemisphere, the $V_{ij}$ term in Equation 2 is also absorbed. Then, approximation of the form factor will become comparatively easy. The buffer is called an item buffer, because the buffer describes not a Z value but whether the geometrical element is visible.

Much consideration of how spotlight is handled in the radiosity method has not been given. Cohen et al have proposed in the aforementioned theses a model by which the form factor $F_{ij}$ of spotlight is approximated as follows.
[Equation 4]

$$F_{ij} = \int_{A_i} \int_{A_j} \frac{\cos^\alpha \phi_i \cos \phi_j}{r^2} V_{ij} d A_j$$

In Equation 4, $\phi_j$ represents the angle formed between a line L, which connects the center $X_i$ of the spotlight and a view point $X_j$ on $A_j$, and the normal vector of $A_j$. $\phi_i$ represents the angle formed between the directional vector of the spotlight and the line L. $V_{ij}$, as with the aforementioned, indicates whether $A_j$ is seen from $A_i$. The term of $\cos^{\alpha \phi_i}$ in Equation 4 corresponds to the aforementioned equation (1) where the intensity-value of the spotlight is attenuated by $\alpha$. However, contribution of $\Theta$ and contribution of $\delta$ in FIG. 4 are not included in Equation 4.

The Background arts, where the error of the radiosity calculation is reduced and quality is enhanced, are roughly classified into a preprocessing type and a postprocessing type. For the preprocessing type, there is a method where, in radiosity calculation itself, a finite element method is applied to the minimum geometrical element unit of a mesh by using a base function of a linear, degree two, degree three, or higher, not a constant base function. (see R. Troutman and N. Max, "Radiosity Algorithms Using Higher Order Finite Element Methods," Proc. SIGGRAPH'93, 209–212, 1993 and H. Zats, "Galerkin Radiosity: A Higher Order Solution Method for Global Illumination," Proc. SIGGRAPH'93, 213–220, 1993) However, the radiosity calculation using the finite element method is not of practical use, because it takes substantial time and a special process is needed in the shading process.

In the postprocessing type, radiosity is usually calculated on the assumption that a constant base function is employed, and various kinds of interpolation methods are employed instead of flat shading. A most simple method is to average the values of elements (e.g., a sample value at a center point), sampled by a constant base function, by using the value of an adjacent element to obtain an energy value at each vertex. This method is called Nodal averaging. Also, when each geometrical element is a triangle, there is an approach to interpolate energy at an arbitrary point in the triangle element with barycentric coordinates (a kind of bilinear interpolation). Furthermore, an interpolation method using a polynomial of higher degree has been proposed. However, these methods for enhancing quality are limited to the interpolation inside of a minimum geometrical element and has the disadvantage that a result largely depends upon the manner in which meshing is performed. As an approach such as making the boundary between light and shade as clear as possible in the result of radiosity, there is discontinuity meshing (D. F. Lischinski et al, "Discontinuity Meshing for Accurate Radiosity," IEEE Computer Graphics & Applications, 12(6), 25–39, 1992). However, this method explosively increases the number of meshes. Therefore, it is nonrealistic that the geometrical element data, obtained by the method, is processed in a manner that a view point is varied interactively by the Gouraud shading of the hardware.

SUMMARY OF THE INVENTION

As described above, there is no conventional method which expresses spotlight with a good quality under Gouraud shading environment. Accordingly, an objective of the present invention is to provide a method which expresses spotlight with a good quality and at high speed under Gouraud shading environment.

Another objective of the present invention is to provide a method which implements the calculation of the form factor of spotlight at high speed in a global illumination method, particularly a radiosity method.

Still another objective of the present invention is to provide a handling method suitable for Gouraud shading which is used in a radiosity method.

A further objective of the present invention is to provide a method which is capable of rendering space which has a boundary whose intensity-value change is large, while reducing aliasing.

To achieve the aforementioned objectives, the present invention carries out the following steps. When a three-dimensional space which has a spotlight source with a cone angle $\theta$ is rendered, a surface of an object in the three-dimensional space is first meshed into a plurality of elements. Then, a radiosity from the spotlight source is calculated for each element which is included inside of the cone angle $\theta$ when viewed from the spotlight source. By limiting radiosity calculation to the elements included inside of the cone angle $\theta$ and performing the first radiosity calculation, the amount of calculation can be considerably reduced. This is because at first the light from the spotlight source does not reach elements which are not included inside of the cone angle $\theta$. In addition, the amount of calculation of whether an element is included inside of the cone angle $\theta$ is reduced as compared with the aforementioned cutting of an overlapped area described in PUPA No. 3-296178. Thereafter, an intensity-value at each vertex of each element is calculated from the radiosity calculated for each element. Next, Gouraud shading is performed by using the intensity-value at each vertex of each element. A result of the Gouraud shading is displayed onto a display.

In the aforementioned radiosity calculating step, an item buffer for the spotlight source can be partitioned in accordance with the cone angle $\theta$ and a form factor can be calculated for an element which is projected inside of the partitioned item buffer. With this, it can be easily judged whether an element is included inside of the cone angle $\theta$.

Also, the form-factor calculating step can use the aforementioned method proposed by Cohen et al. but may include steps of storing an ID and the distance r of an element which is projected on each pixel in the item buffer and is nearest to the spotlight source into each pixel in the item buffer and of summing up a value determined based on a position of each pixel in the item buffer, the stored distance r, and parameters set for the spotlight source, with respect to pixels in the item buffer in which an ID of one element is stored. With this, the form factor can be calculated in accordance with the definition of the spotlight source.

In the intensity-value calculating step, an average of radiosities of elements which share one vertex of an element may be used to calculate an intensity-value of the one vertex. This is the same as the aforementioned Nodal averaging. This step is simple and operated at high speed.

The rendering method may further include the steps of selecting a certain vertex, calculating the distance between the certain vertex and another vertex, and weighting by a function of the distance the intensity-value at each vertex calculated by the intensity-value calculating step and modifying the intensity-value at the certain vertex in accordance with the weighted intensity-values. If this smoothing process is carried out, the spotlight can be rendered with a better quality. The smoothing process of the present invention is not limited to the spotlight but it is also applicable when a scene whose intensity-value change is large is rendered.

Also, the rendering method may further include the steps of judging whether a difference between the intensity-values of one vertex and a vertex adjacent to the one vertex has exceeded a predetermined threshold value, subdividing elements including the one vertex when the difference has exceeded the predetermined threshold value, and carrying out the radiosity calculating step and the subsequent steps for elements generated as a result of the subdivision. By adaptively performing meshing in this way, aliasing can be reduced and the spotlight can be rendered with a high quality. Note that, after the smoothing process, it can also be judged whether a difference between the intensity-values of adjacent vertices has exceeded a predetermined threshold value. That is, the adaptable meshing according to the present invention is carried out when the smoothing process cannot be utilized effectively.

The present invention does not depend upon the element shape and the element size when meshing is performed, so users may specify the element shape and the element size.

Also, the function of the distance that is used in the smoothing process may be a function which attenuates in an isotropic manner with the distance as a parameter. This is because a vertex is not much influenced by the intensity-value of another vertex far away from that vertex.

In addition, the function of the distance may be a piece-wise three-order polynomial filter function or a Gaussian filter function.

Furthermore, the function of the distance may be a function which outputs zero when an input distance is more than a predetermined value. This is because the influence of the intensity-value of a vertex existing at a distance more than a predetermined value can be considered to be zero.

Implementation of an apparatus for carrying out the aforementioned steps and a program for executing the steps is apparent to those skilled in the art. Therefore, the present invention includes various kinds of embodiments.

DESCRIPTION OF THE PREFERRED EMBODIMENT

Figure 5:
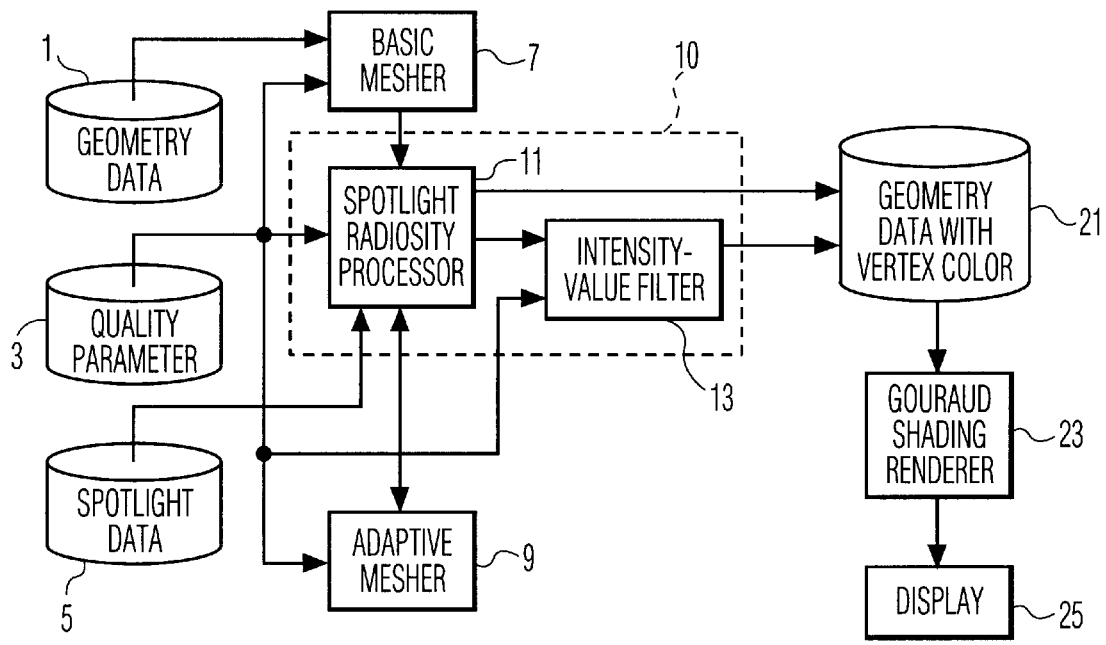
FIG. 5 is a functional block diagram of the present invention.

A functional block diagram of the present invention is shown in FIG. 5. The data of a geometry data 1 and the data of a quality parameter 3 are input to a basic mesher 7. The data of the quality parameter 3 and the data of a spotlight data 5 are input to a spotlight radiosity processor 11. The spotlight radiosity processor 11 is linked with an adaptive mesher 9 and an intensity-value filer 13 and cooperates with them as needed. The data of the quality parameter 3 is also input to the adaptive mesher 9 and the intensity-value filter 13. The outputs of the spotlight radiosity processor 11 and the intensity-value filter 13 are output as geometry data with vertex color 21. The geometry data with vertex color 21 is processed by a Gouraud shading render 23 and displayed on a display unit 25. Note that the portion belonging to the present invention is a part 10 enclosed by a broken line in FIG. 5.

(1) Geometry Data 1

The geometry data is expressed, for example, in the external file format of Renderman (see S. Upstill, The RenderMan Companion, Addison-Wesley Publishing Co., 1992) called RIB (RenderMan Interface Bytestream), the external file format of VRML (Virtual Reality Modeling Languages) called WRL, or the IV format of Open Inventor. The content of the geometry data includes the shape, position, and orientation of an object and attributes (such as color, gloss, reflectance and absorptivity, transparency, and use of a texture. As the kind of a geometrical shape of an object, there is a polygon, a quadric, a bicubic patch, and NURBS (Non-Uniform-Rational B-Splin).

For instance, an example, expressed in RIB format, is shown as follows.

Surface "plastic" "Ka" [0.1] "Kd" [1] "Ks" [0.25] "roughness" [0.25] "specularcolor" [1 1 1]
Attribute of a surface: plastic and a perfectly diffusing and reflecting surface (diffusion and reflection coefficient Kd=1.00)
Mirror reflection (Ks=0.25)
Color [1 0 0]
Polygon "P" [−100.0 −100.0 −150.0
  −100.0 −100.0 −350.0
  −100.0 100.0 −350.0
  −100.0 100.0 −150.0]
Definition of a wall on the left side (x=−100.0) by a red rectangular polygon
Color [0 0 1]
Polygon "P" [100.0 −100.0 −350.0
  100.0 −100.0 −150.0
  100.0 100.0 −150.0
  100.0 100.0 −350.0]
Definition of a wall on the right side (x=100.0) by a blue rectangular polygon
Lightsource "spotlight"1
  "from" [0.0 70.0 −250] "to" [0 0 −250]
  "coneangle"0.35 "intensity"500.0 "lightcolor" [1 1 1]
  "beamdistribution"1.0 "conedeltaangle"0.0
Definition of spotlight (2) Quality Parameter 3

In the present invention the following quality parameters are employed.
1. BM_meshType
2. BM_elementSize
3. BM_patchSize
4. SRA_iterationMax
5. SRA_energyThreshold
6. SRA_bufferSize
7. MIF_flag
8. MIF_func
9. MIF_width
10. MIF_scale
11. AMS_flag
12. AMS_intensityThreshold The symbol of each parameter to the under bar indicates in what functional block the parameter is employed. BM means the basic mesher 7, SRA the spotlight radiosity processor 11, MIF the intensity-value filter 13, and AMS the adaptive mesher 9.

1. BM_meshType

This parameter is a parameter which specifies the type of a mesh. The present invention is constructed so that 1 means a hierarchical triangular mesh, 2 a Delaunay mesh (see M. Cohen and J. R. Wallance, "Radiosity and Realistic Image Synthesis," Academic Press Professional, Cambridge, Mass. 1933), and 3 a hierarchical rectangular mesh. In this way, the mesh type may be specified, or it may be fixed. The mesh type is not limited to this.

2. BM_elementSize and 3. BM_patchSize

The present invention uses a three-level mesh structure. The mesh becomes smaller in the order of a rough mesh, a patch, and an element. BM_elementSize is a parameter which specifies element size and BM_patchSize is a parameter which specifies patch size. A single patch is constituted by several elements and a single rough mesh is constituted by several patches.

4. SRA_iterationMax and SRA_energyThreshold

These parameters controls the number of radiosity calculations of the spotlight. SRA_iterationMax represents the upper limit of the number of calculations when the energy irradiated from a spotlight source iterates diffusion reflection like the second and the third diffusion reflection, irradiating energy. A larger SRA_iterationMax means that calculation is iterated up to the state nearer the equilibrium of energy. SRA_energyThreshold is a parameter which specifies the stoppage of calculation when the energy of the patch currently selected as an n-order light source is less than a value specified by this parameter, independently of the number of calculations. When only a high-speed operation is desired, radiosity calculation may be ended with single irradiation from a spotlight source.

6. SRA_bufferSize

This parameter is a parameter for specifying the size of an item buffer.

7. MIF_flag

This parameter is a parameter for indicating whether or not the intensity-value filter 13 is employed.

8. MIF_func

This parameter is a parameter for specifying a function which is used in the intensity-value filter 13.

9. MIF_width

This parameter is used for specifying the width of the window of the aforementioned function.

10. MIF_scale

This parameter is used for controlling the intensity of a filter.

11. AMS_flag

This parameter is a flag for specifying whether or not the adaptive mesher 9 is actuated.

12. AMS_intensityThreshold

The adaptive mesher 9, if the difference between the intensity-values of certain vertices exceeds a certain threshold value, will adaptively subdivide the element (of a mesh) including the vertices adaptively. This "certain threshold value" is specified by this parameter.

(3) Spotlight Data 5

The spotlight data 5 includes data which is required of a spotlight as a light source. Particularly, the spotlight data 5, in addition to the parameters (1. from, 2. to, 3. coneangle, 4. conedeltaangle, 5. beamdistribution) stated in the part of "Background art", includes the intensity-value of a light source (in the present invention each energy of RGB).

(4) Basic Mesher 7

Figure 6:
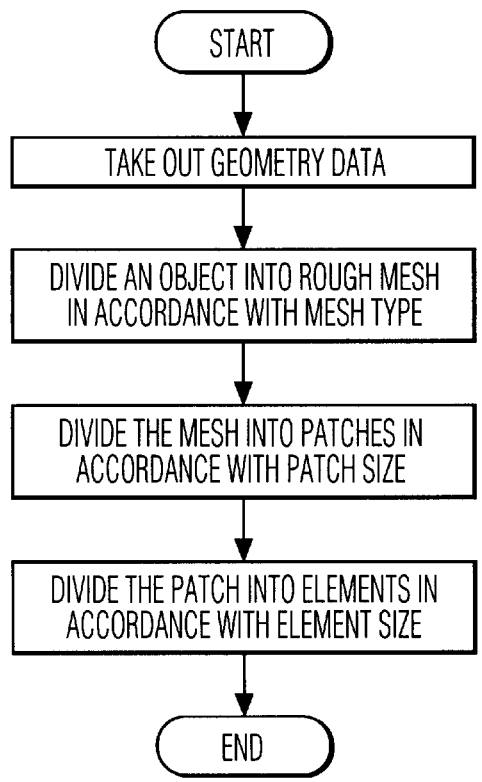
FIG. 6 is a flow chart showing a meshing process.

The basic mesher 7 divides, into a plurality of elements, an object being rendered in a three-dimensional space by using the geometry data 1, and (1) BM_meshType (2) BM_elementSize, and (3) BM_atchSize among the quality parameter 3. As described above, in the present invention a mesh has a three-level structure. First, the object is divided into rough meshes in accordance with BM_meshType. Then, the mesh is divided into patches in accordance with BM_elementSize. Finally, the patch is divided into elements in accordance with BM_patchSize (FIG. 6). For a further detailed discussion on the meshing, see M. Cohen and J. R. Wallance, "Radiosity and Realistic Image Synthesis," Academic Press Professional, Cambridge, Mass., 1933.

(5) Spotlight Radiosity Processor 11

The aforementioned conventional methods do not take the characteristic parameters of the spotlight, such as the cone angle and delta angel of spotlight, into consideration. Also, the operating speed is extremely slow, because parameters such as a cone angle and a delta angle are ignored and all geometrical elements in a scene are processed.

Then, in the present invention the operating speed is made to be fast by taking in a parameter included in spotlight, such as a cone angle, and at the same time, causing an object (elements) outside the cone angle to be outside of an object of radiosity calculation. The form factor is represented by the following Equation 5.

[Equation 5]

$$F_{ij} = \int_{A_i} I \frac{\cos\phi_j}{r^2} V_{ij} dA_j$$

where I is represented by the aforementioned equation (1).

$$I = x \text{ smoothstep } (\cos\theta, \cos(\theta-\delta), x) \tag{1}$$

where $x = (L \cdot A)^\alpha$ and the smoothstep (a, b, c) is given by the following Equation 6.

[Equation 6]

$$\text{smoothstep}(a, b, x) = \begin{cases} 0.0 & \text{if } x < a \\ 1.0 & \text{if } x > b \\ \text{hermite}(1.0 - (x-a)/(b-a)) & \text{otherwise} \end{cases}$$

Figure 1:
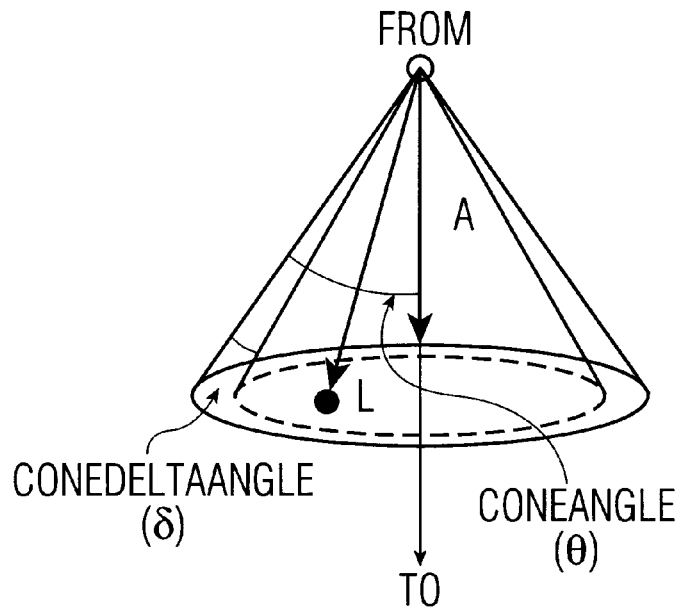
FIG. 1 is a diagram used for explaining various kinds of parameters of a spotlight source.
Figure 2:
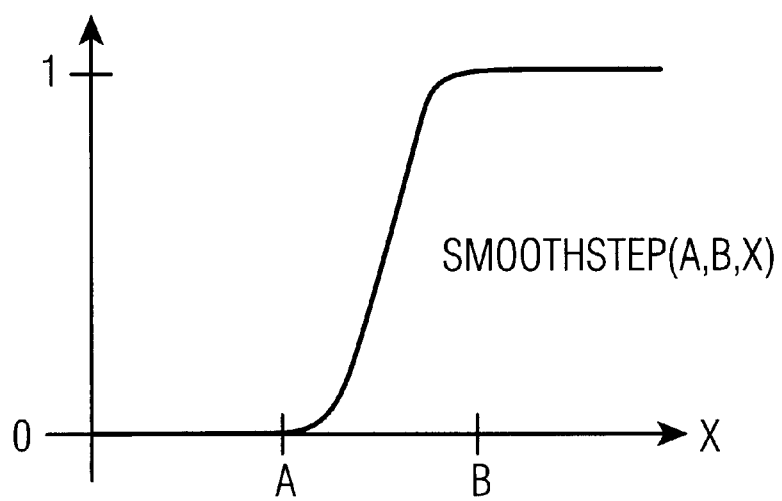
FIG. 2 is a diagram used for explaining a function of smoothstep.
Figure 3:
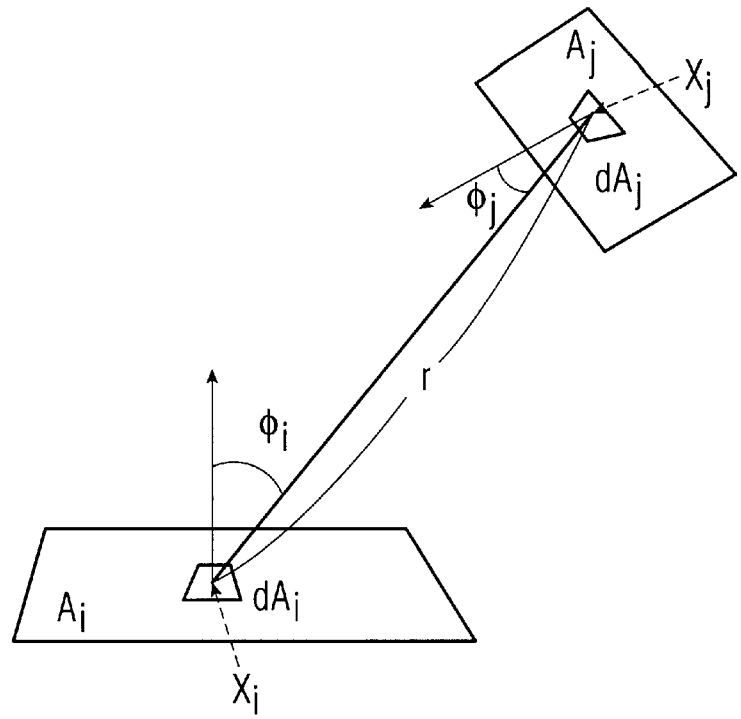
FIG. 3 is a diagram used for explaining a general form factor calculation of a radiosity method.
Figure 4:
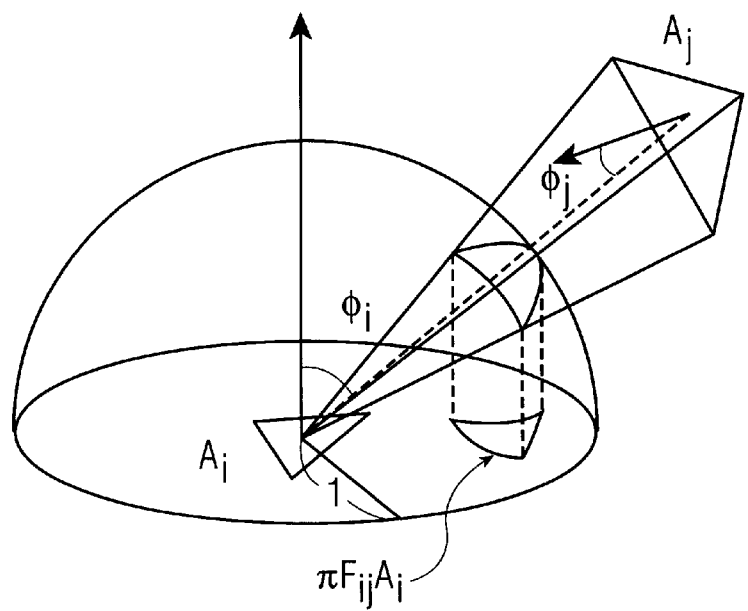
FIG. 4 is a diagram used for explaining the form factor calculation based on a Nusselt Analog method.

In Equation 6, hermite $(x) = 2x^3 - 3x^2 + 1$. $V_{ij}$ indicates whether $A_i$ is inside of the cone angle of spotlight. When $A_i$ is inside of the cone angle of spotlight, $V_{ij}$ is 1, and when $A_i$ is not inside of the cone angle of spotlight, $V_{ij}$ is 0. This is merely an example. The smoothstep function, as shown in FIG. 2, may be another function if it is a function such as smoothly increasing between a and b. By the calculation of the form factor such as this, the characteristic parameters of the spotlight can be taken into.

In addition to the aforementioned smoothstep function, the smoothstep function can be defined by two Bezier functions of degree three.

[Equation 7]

$$\text{smoothstep2}(a, b, x) = \begin{cases} 0.0 & \text{if } x < a \\ 1.0 & \text{if } x > b \\ \text{bezier1}\left(\frac{x-a}{b-a}\right) & \text{if } a \leq x \leq \frac{a+b}{2} \\ \text{bezier2}\left(\frac{x-a}{b-a}\right) & \text{if } \frac{a+b}{2} \leq x \leq b \end{cases}$$

where Besier $1(x) = x^2(3-2x)$ and Besier $2(x) = (1-x)^2(14x-5) + (2x-1)(18x-12x^2-5)$.

Figure 7:
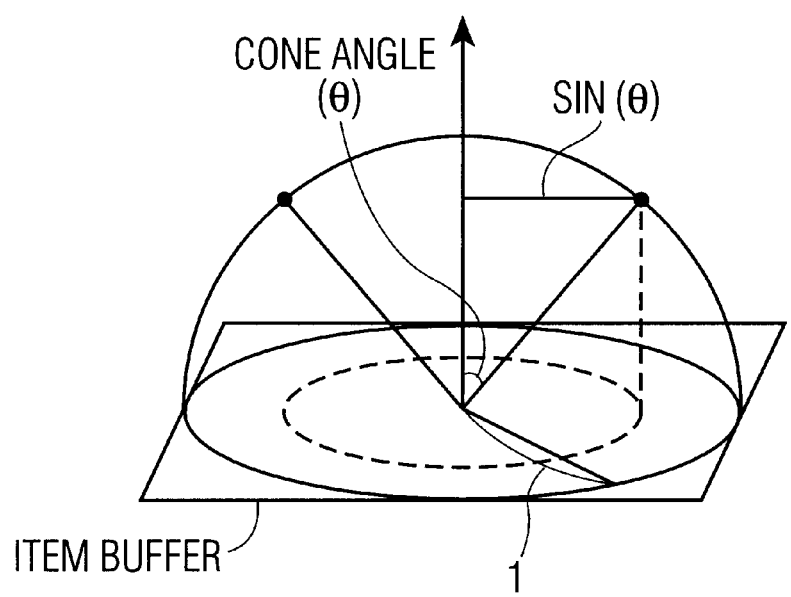
FIG. 7 is a diagram used for explaining an item buffer of the present invention.
Figure 8:
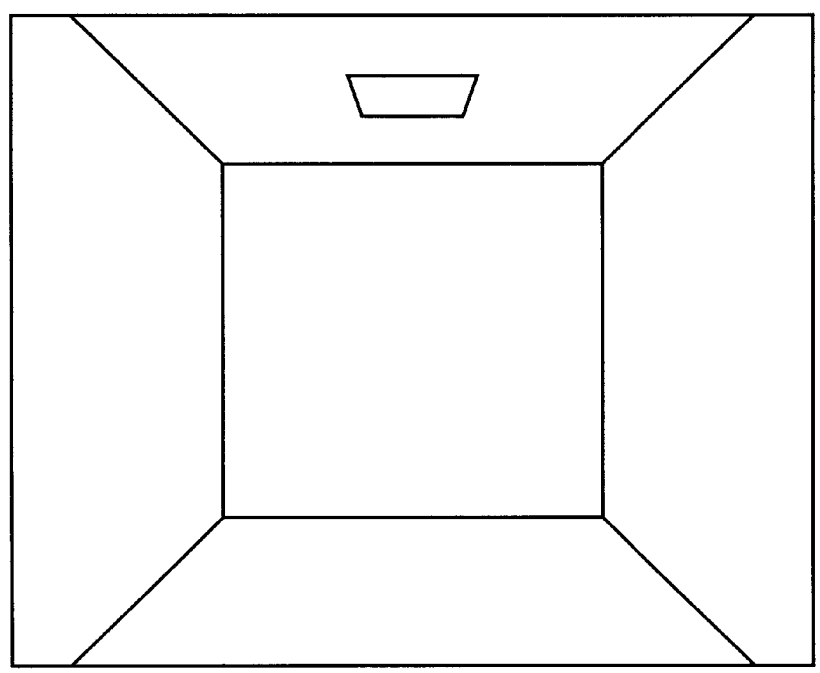
FIG. 8 is a diagram showing the result of a rendered scene which has a surface light source.
Figure 9:
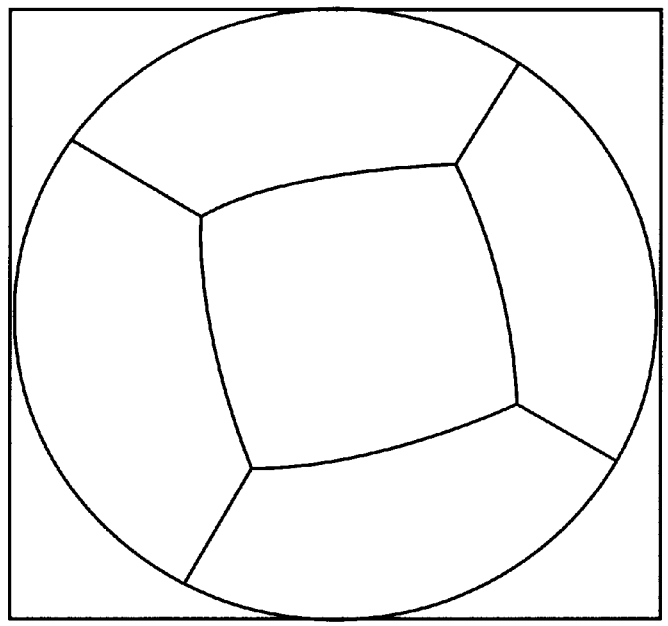
FIG. 9 is a diagram showing the content of the item buffer in the case of FIG. 8.
Figure 10:
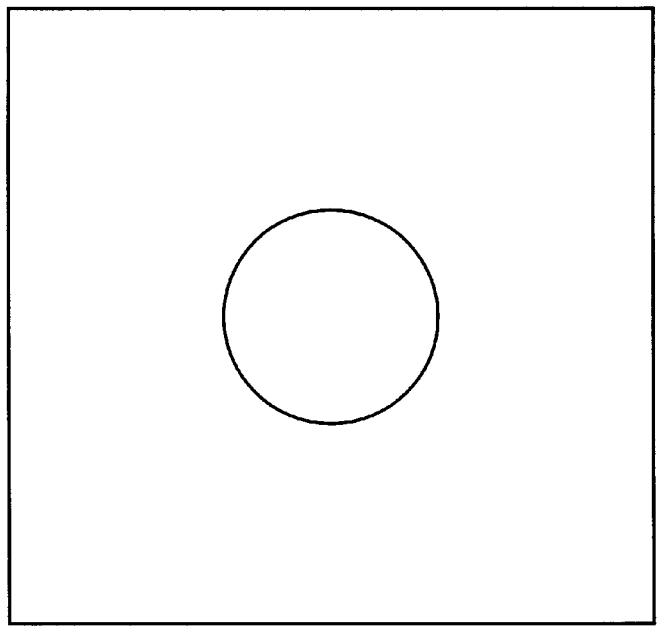
FIG. 10 is a diagram showing the content of an item buffer of a spotlight source of the present invention.

Also, the operation, which causes an element which is not inside of the cone angle to be outside of an object of radiosity calculation, will be described with FIG. 7. As with Nusselt Analog described in the background art, the center of the spotlight is put to the center of a unit hemisphere, and the direction of irradiation of the spotlight is taken just above the center of the unit hemisphere. Then, a normalized item buffer is placed on the opposite surface of the hemisphere. The foregoing is the same as Nusselt Analog, but, in the present invention, only the part which is really irradiated by the spotlight is cut out from the hemisphere with the cone angle θ of the spotlight. This part is projected on the bottom surface of the hemisphere and corresponds to a region inside of a circular arc indicated by a broken line. In Nusselt Analog an object is clipped at the equator of the hemisphere, whereas in the present invention the object is clipped at the circular arc on the hemisphere defined by the cone angle of the spotlight. Therefore, the geometrical element which is not irradiated by spotlight is not written to the item buffer, and the form factor is calculated at high speed. This difference is clear from the fact that, while the content of the item buffer of a surface light source (FIG. 8) becomes as shown in FIG. 9, the content of the item buffer in the case of the present invention (FIG. 21) becomes as shown in FIG. 10. This is indicated by $V_{ij}$ in the Equation 5.

As described above, the radiosity method is a method which calculates the intensity of an object by obtaining the equilibrium state of the reflection and collection of the light energy between objects on the assumption that incident light is perfectly scattered and reflected at surfaces of all objects. Therefore, the radiosity of the elements irradiated by single emission from the spotlight source is not only calculated but it is also possible to iterate the operation that the element whose radiosity is largest among the irradiated elements is selected as a light source and the radiosity of each element on which the reflected light from the selected element is irradiated is calculated. When, in the present invention, an element with the largest radiosity value is judged, the radiosity is approximated with the discrete models of RGB and sorting is performed for the total energy ($B^{red}i + B^{green}i + B^{blue}i$) of RGB. The discrete models of RGB of the radiosity are defined by Equation 8.

[Equation 8]

$$B_i^{red} = E_i^{red} + \rho_i^{red} \sum_{j=1}^{N} B_j^{red} F_{ij}$$

$$B_i^{green} = E_i^{green} + \rho_i^{green} \sum_{j=1}^{N} B_j^{green} F_{ij}$$

$$B_i^{blue} = E_i^{blue} + \rho_i^{blue} \sum_{j=1}^{N} B_j^{blue} F_{ij}$$

The number of this iterative calculations is limited by the aforementioned SRA_iterationMax parameter, and the number of this iterative calculations is limited from another point of view by the aforementioned SRA_energyThreshold parameter. The aforementioned clipping of the item buffer is performed only when an element is seen from the spotlight source. In the case seen from other elements (i.e., handled as a light source), the clipping is not performed.

In the present invention, the level of a patch is the minimum unit at which energy is irradiated and the level of an element is the minimum unit at which energy is received. This is because there is the advantage that, if the level of an element is the minimum unit at which energy is received, data for finer rendering can be generated and, if the level of the second patch is the minimum unit at which energy is irradiated, the time for detecting an element whose radiosity is largest will be reduced when radiosity calculation is performed based on the iterative diffusion and reflection, as described above, and thus the operating speed can be increased. Note that it is arbitrary to use a hierarchical mesh structure as in the present invention. It is also arbitrary to change the mesh level at the irradiation and the reception of energy in the aforementioned way.

Figure 11:
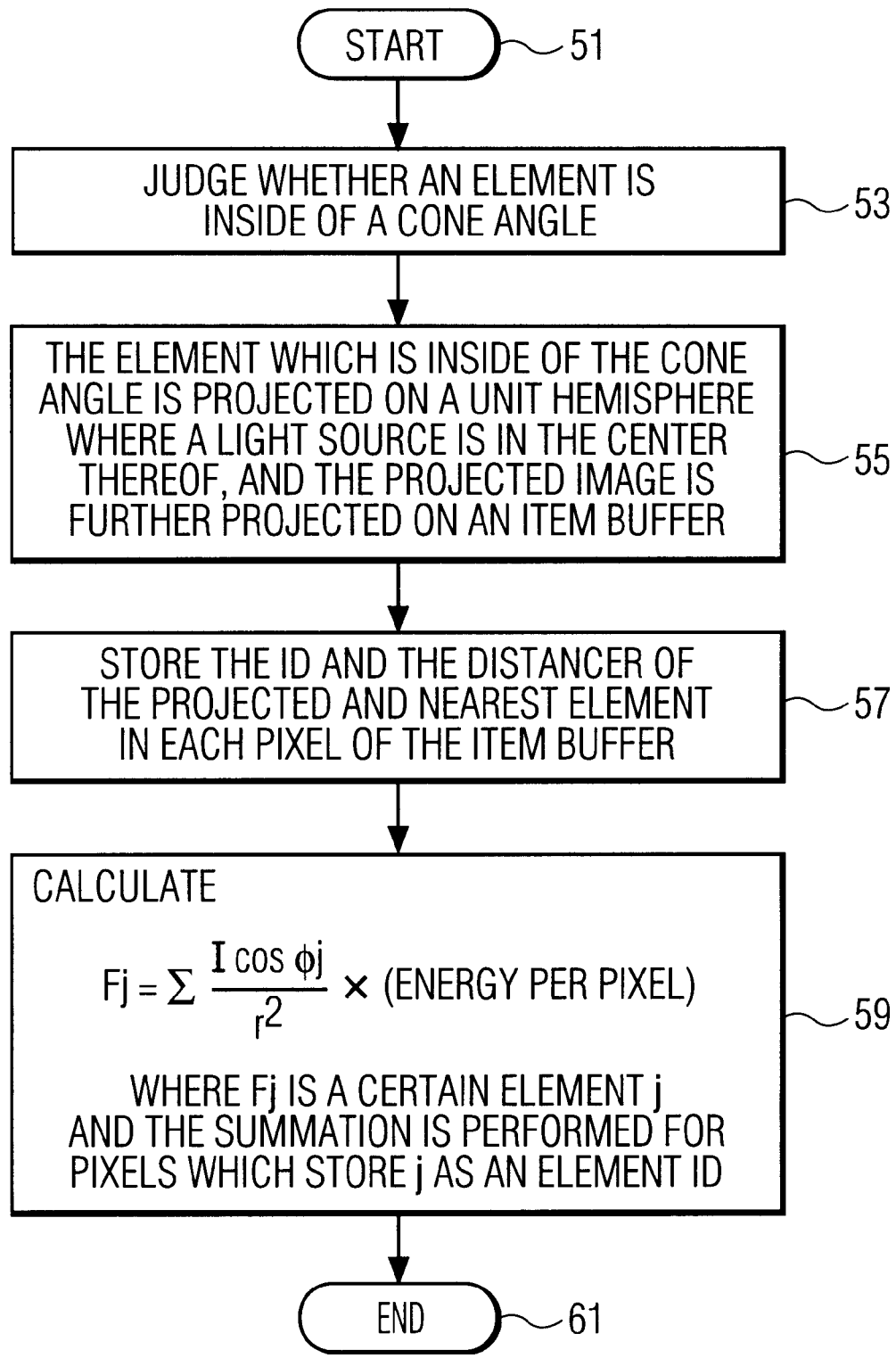
FIG. 11 is a flow chart showing the form factor calculation of the present invention.

The process of calculating the aforementioned form factor is shown in FIG. 11. First, it is judged whether an element is inside of the cone angle θ (step 53). This judgment is performed by judging whether the vertex of each element is inside of the cone angle. If all vertices of the element is inside of the cone angle or some of the vertices are inside of the cone angle, the subsequent processes will be performed.

When the vertices of the element are not inside of the cone angle, the element is thrown away without performing the subsequent processes. With this, the number of elements which are processed can be reduced. Next, an element which is inside of the cone angle θ is projected on the unit hemisphere where the light source is in the center thereof and the projected image is further projected on the item buffer placed on the equator of the unit hemisphere (step 55). This processing is the same as the conventional Nusselt Analog. However, as described above, even at the time the element has * been projected on the item buffer, there is the possibility that some of the vertices of the projected element will be inside of the item buffer corresponding to the cone angle θ and the remaining vertices will be outside of the item buffer.

The ID and the distance r of the element nearest to the light source among the projected element are stored in each pixel of the item buffer (step 57). The projected element overlaps with some pixels on the item buffer. Therefore, the ID and the distance r of the projected element is stored in the overlapped pixels. However, as projection of elements is performed in sequence, there are cases where a plurality of elements are projected on the same pixel of the item buffer. In this case there is the need for storing the ID and the distance of an element nearest to the spotlight source. Therefore, each time one element is processed, the ID and the distance of a nearer element is updated. When part of the projected element overlaps with the region of the item buffer corresponding to the cone angle θ, the ID and the distance r of the element, projected only on the pixel in the region of the item buffer corresponding to the cone angle θ, are stored. Because the region of the item buffer corresponding to the cone angle 0 is easily obtained from the radius of the light source, it can be easily judged whether or not a pixel is inside of that region.

If the projection of the element inside of the cone angle θ is completed in the aforementioned way, the form factor $F_j$ of the element can be obtained. In this case the subscript i of $F_{ij}$ is omitted because the subscript i is a spotlight source. That is, although the form factor is basically obtained by Equation 5, $dA_j$ is approximated with the area (energy value) of one pixel and $F_j$ is expressed by the following Equation 9.

[Equation 9]

$$F_j = \sum \frac{I\cos\phi_j}{r^2} \text{ (Energy per pixel)}$$

In Equation 9, energy per pixel is set beforehand and an addition is performed for the pixels of the item buffer where the same ID of the projected element is stored. Also, the r in Equation 9 employs the r stored in the pixel, and I is obtained by the aforementioned equation (1). The cone angle θ, the delta angle δ, and the degree of attenuation a in equation (1) are determined by the definition of the spotlight. Also, the L needed for obtaining the x of equation (1) will be easily determined if the address (m, n) of the pixel in the item buffer is obtained. The $\cos \phi_j$ in Equation 9. is obtained as a cosine of an angle formed between the normal vector of an element and a line which connects the center of the element and the center of the spotlight.

If the aforementioned process is performed for all elements inside of the cone angle, the form factor calculation for the spotlight source will be completed. Therefore, if the calculation described in the background art is executed, the radiosity can be calculated from the form factor. Only by the form factor calculated up to this, the radiosity is calculated for the elements irradiated by the first irradiation of spotlight. For the remaining elements, the form factor is calculated by using the aforementioned Nusselt analog method and so on when the second-order and the third-order diffusion and reflection are taken into consideration, and then the calculated form factor is converted to radiosity. Although Equation 5 includes $v_{ij}$, this is processed by whether or not an element is inside of the cone angle, as described above.

In the present invention, as described above, predetermined energies (radiosities) of red, green, and blue are irradiated from a light source, and the respective energies are diffused and reflected, taking the color of the irradiated element into consideration ($\rho_i$ of Equation 3 is employed). However, the Gouraud shading render 23 requires the geometry data with vertex color 21, not the radiosity of each element. Therefore, the intensity-value of each vertex needs to be calculated from the radiosity of each element. For this calculation, the present invention employs as a simplest method the aforementioned Nodal Averaging described in the background art. The processing in this Nodal averaging method will be described with an example of FIG. 12.

Figure 12:
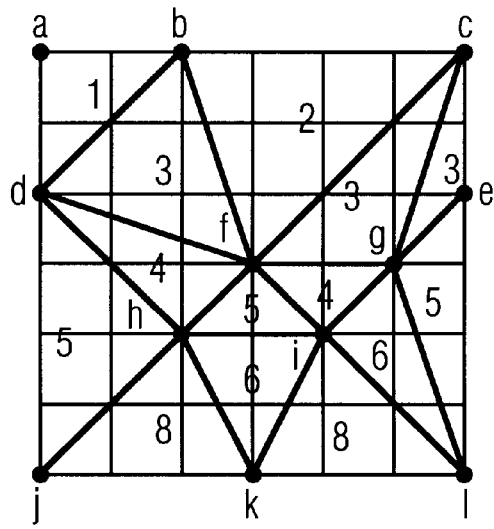
FIG. 12 is a diagram used for explaining Nodal Averaging.

In FIG. 12 an object is segmented into triangular elements and vertices (a), (b), (c), (d), (e), (f), (g), (h), (i), (j), (k), and (l) exist. The numerical figure in each triangular element represents the result of the radiosity calculation obtained in the aforementioned processing. For making a description short, it is assumed that RGB is not considered and that energy is simply represented by the numerical figure in each triangular element. For instance, the node (f) is shared by triangles (fbd), (fdh), (fhi), (fig), and (fgc). In the Nodal Averaging method, the radiosities of these elements, as they are, are added and the added radiosities are divided by the number of elements. The obtained value is taken to be an intensity-value at the vertex (f). More specifically, the intensity-value of the vertex (f) reaches 3.5=(3 +2 +3 +4 +5 +4)/6.

The aforementioned averaging method is performed for all vertices. The result is obtained as follows.

| Vertex | Intensity-value |
| --- | --- |
| a | 1.000 |
| b | 2.000 |
| c | 2.667 |
| d | 3.250 |
| e | 4.000 |
| f | 3.500 |
| g | 3.500 |
| h | 5.600 |
| i | 5.800 |
| j | 6.500 |
| k | 7.333 |
| l | 6.333 |

In the aforementioned way, the radiosity obtained for each element can be converted to the intensity-value of each vertex of each element. In the present invention, radiosities are obtained for red, green, and blue, respectively, so the Nodal averaging is performed for each of red, green, and blue. However, it is arbitrary to adopt the method of calculating a radiosity for each of red, green, and red. After calculation of one kind of radiosity (energy), the color of each vertex can also be calculated, taking the color of light irradiated from a light source and the color of an element into consideration.

Figure 13:
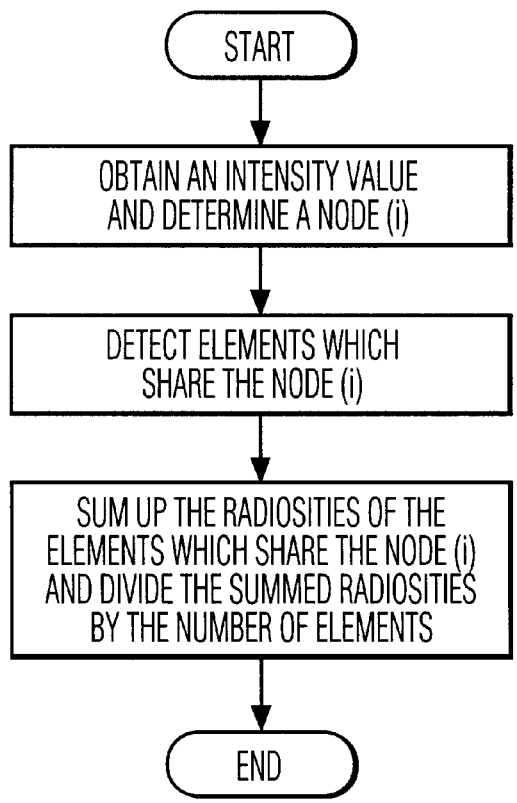
FIG. 13 is a flow chart showing the Nodal Averaging.

The flow of the aforementioned Nodal averaging process is shown in FIG. 13.

The aforementioned Nodal Averaging is merely an example and therefore it is also possible to weight an element in accordance with the angle of each triangle and perform the averaging. For instance, it is assumed that the angles of 6 triangles enclosing the point (f) of FIG. 12 are 45° for an angle dfb, 60° for an angle bfc, 45° for an angle cfg, 50° for an angle gfi, 90° for an angle ifh, and 70° for an angle hfd. In this case the intensityvalue of the point (f) is calculated as (45*3+60*2+45*3+50*4+90*5+70*4)/360= 3.667.

The radiosity calculation may be performed by an approach where a Vovonoi polygon obtained by a Vovonoi diagram is used as an element and rendered by Delaunay triangulation which is dual elements (Sturzlinger. W. "Radiosity with Vovonoi-diagram", Third Eurographics Workshop on Rendering, 1992, pp. 169–177). In this case, generally the node of a Delaunay triangle, which becomes an object of rendering, is included inside of a Vovonoi polygon, so the radiosity value of each Vovonoi polygon, as it is, is given to the node of the triangle without executing the Nodal averaging method.

(6) Geometry data with vertex color 21

Thus, the geometry data with vertex color, that is, the data of the intensity-value, including the position and color of each vertex, is given to the vertex of each element. This data is stored from each vertex in the geometry data with vertex color 21.

(7) Gouraud shading render 23

The Gouraud shading, as described above, is a shading method where an intensity-value is approximated at an arbitrary point in geometrical data by linearly interpolating the intensity-value of a vertex. Since this method is well known, it will not be described any further. For a further detailed discussion on the Gouraud shading, see the references mentioned in the background art.

(8) Display 25

Figure 14:
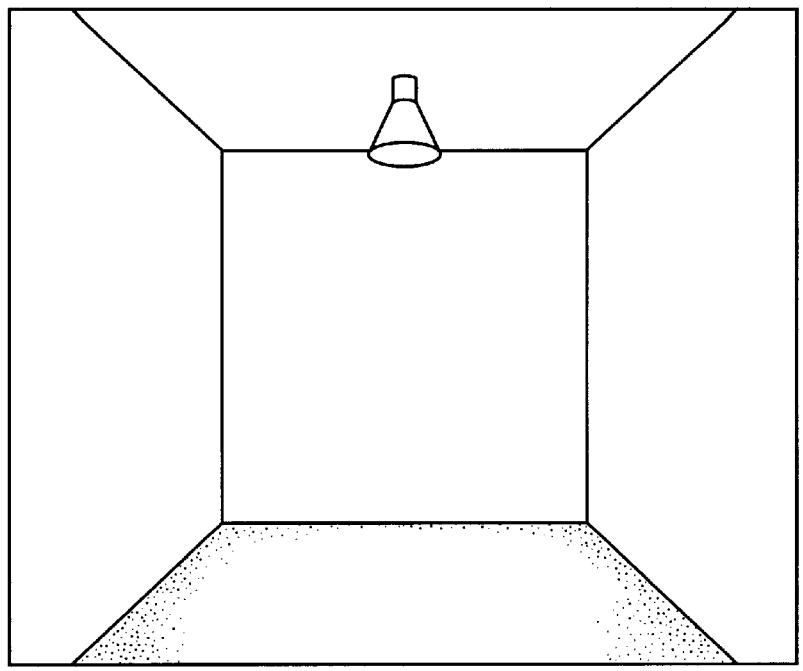
FIG. 14 is a diagram showing the result of Gouraud shading obtained by a spotlight radiosity processor.
Figure 15:
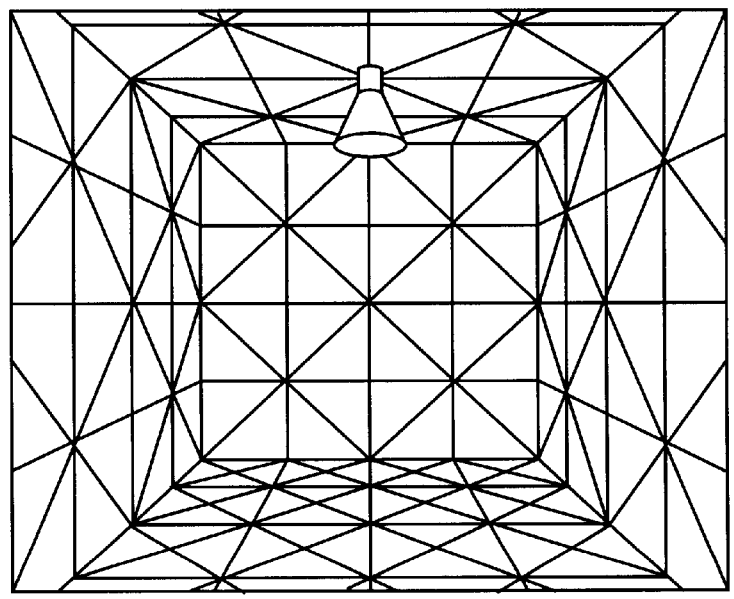
FIG. 15 is a diagram showing an example of the result of meshed elements.

As a result of the aforementioned processing, a result such as that shown in FIG. 14 is obtained and displayed on the display 25. Although FIG. 14 is a simple example, the effect of spotlight is represented on the floor, there is no possibility that the room will become black as in the case where Gouraud shading is simply performed. The state of the meshing is shown in FIG. 15.

(9) Intensity-value filter 13

Even when the geometry data with vertex color generated by the spotlight radiosity processor 11, as it is, were rendered by the Gouraud shading render 23, a sufficient effect would be obtainable. However, when rendering spotlight effects with a better feeling of quality, the MIF_flag parameter among the aforementioned quality parameters is turned on to actuate the intensity-value filter 13. The advantage of the intensity-value filter 13 of the present invention is to correct errors arising from the fact that the radiosity calculation basically handles each element as a constant-energy element. In addition, there is no possibility that the number of input elements will be increased, so an increase in the amount of calculation is suppressed.

Figure 16:
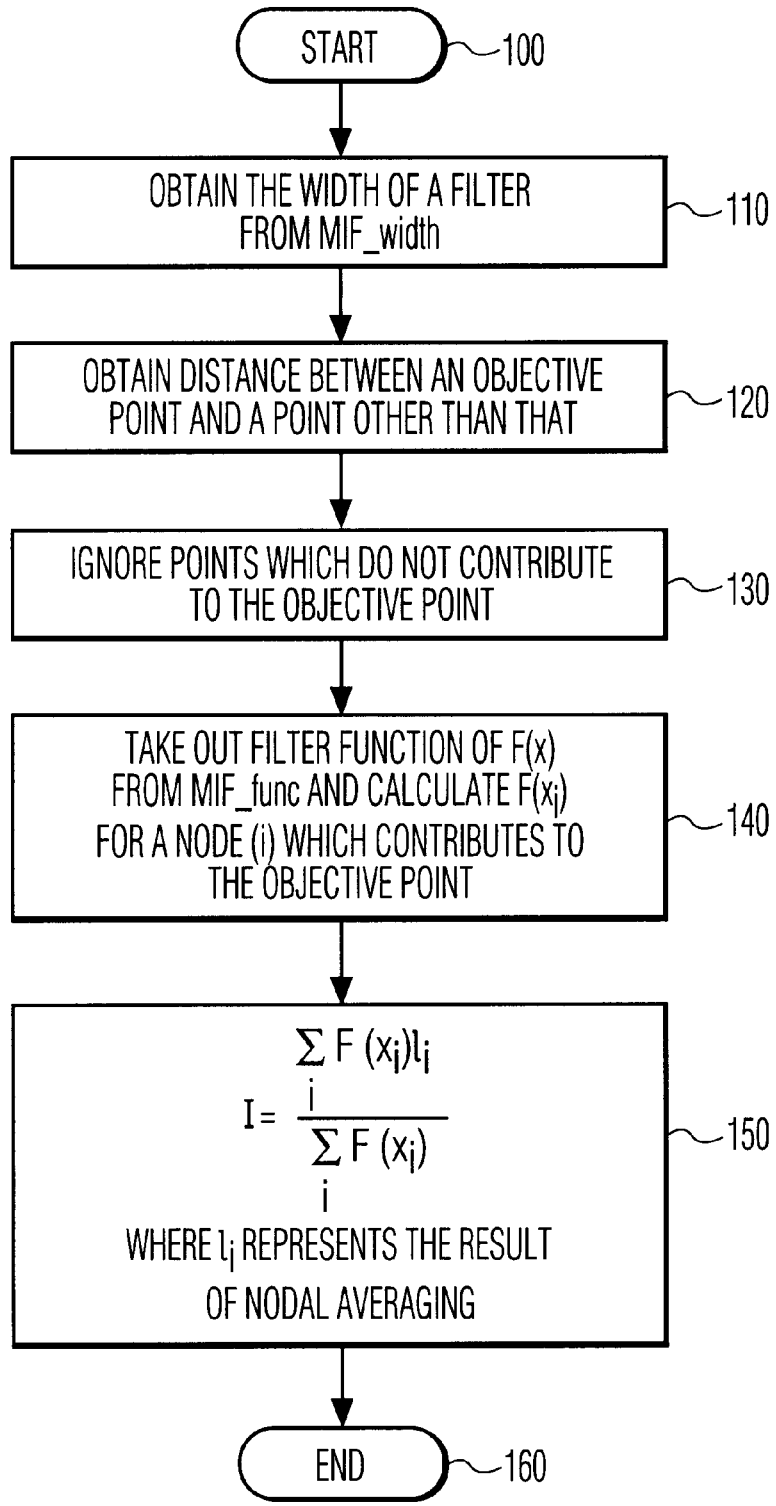
FIG. 16 is a flow chart showing the steps executed by an intensity-value filter 13.
Figure 17:
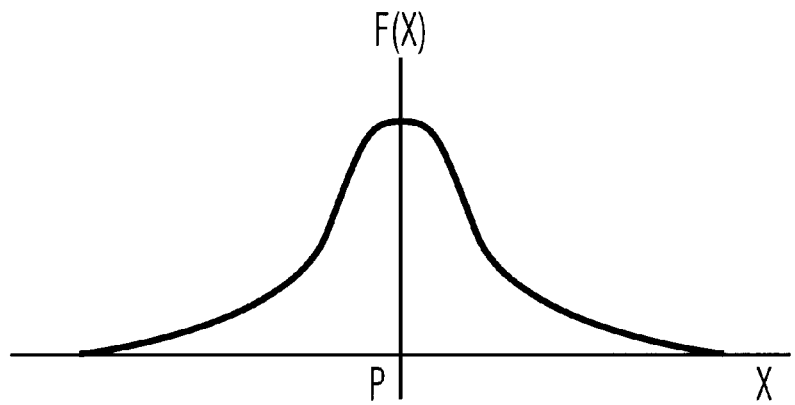
FIG. 17 is a diagram showing an example of a filter function.

The aforementioned processing is shown in FIG. 16. In the processing started in step 100, the width (or window) w of the filter is first obtained from the MIF_width parameter (step 110). Then, the distance x between an objective point and a point other than that is obtained (step 120). The points which do not contribute to the objective point are ignored (step 130). The points which do not contribute to the objective point depend on a filter function to be described later but are nearly determined by the width of the filter. The filter function F(x) is taken out from the MIF_func parameter and F(xi) is calculated for a vertex contributing to the objective point. It is preferable that the function specified by the MIF_func parameter be a function which attenuates from the objective point in an isotropic manner with space distance as a parameter. An example in a two-dimensional space is shown in FIG. 17. As an example of a function such as this, the present invention proposes the following two functions.

1. Gaussian filter $$F(x) = \exp(-(x^2/2w^2))$$

2. Piecewise degree three polynomial filter

[Equation 10]

$$F(x) = \frac{1}{6} \begin{cases} (12 - 9B - 6C)\left|\frac{x}{w}\right|^3 + \\ \quad (-18 + 12B + 6C)\left|\frac{x}{w}\right|^2 + (6 - 2B) & \text{if } \left|\frac{x}{w}\right| < 1 \\ (-B - 6C)\left|\frac{x}{w}\right|^3 + (6B + 30C)\left|\frac{x}{w}\right|^2 + \\ \quad (-12B - 48C)\left|\frac{x}{w}\right| + (8B + 24C) & \text{if } 1 \leq \left|\frac{x}{w}\right| < 2 \\ 0 & \text{otherwise} \end{cases}$$

If B and C are taken to be 1 and 0, Equation 10 will become a degree three B-spline filter function. When B=0 and C=0.5, Equation 10 becomes a degree three Catmull-Rom spline function. The coefficients of the piecewise degree three polynomial are determined from the fact that the filter function is continuous as a whole and the first-order differentiation is also continuous and also from a normalized Equation 11.

[Equation 11]

$$\int_{-\infty}^{\infty} F(x)dx = 1$$

A filter function such as this is not limited to the aforementioned function but it may be any function if it has a characteristic such as that shown in FIG. 17. Also, the filter function can be multiplied by a scale specified in MIF_scale.

F(xi) is calculated for each vertex i, and from the intensityvalue Ii obtained by the aforementioned Nodal averaging method, Equation 12 is calculated (step 150).

[Equation 12]

$$I = \frac{\sum_i F(x_i) I_i}{\sum_i F(x_i)}$$

Thus, the intensity-value is modified so that the result of the Nodal averaging is weighted by a function of the distance. In the example of FIG. 12 the node (f) is taken to be an objective point and the aforementioned processing is performed. A degree three B-spline filter function is employed as a filter function. Various parameters are as follows. The width w is assumed to be 2.0. When the absolute value of x/w is greater than 2, it is assumed that there is no contribution to the objective point. (That is, when the distance x is more than 4.0, there is no contribution.)

[TABLE 1]

| Point | x | \|x/ω\| | F(x) | $I_{old}$ |
|---|---|---|---|---|
| a | 4.243 | 2.121 | 0.000 | 1.000 |
| b | 3.162 | 1.581 | 0.012 | 2.000 |
| c | 4.243 | 2.121 | 0.000 | 2.667 |
| d | 3.162 | 1.581 | 0.012 | 3.250 |
| e | 3.162 | 1.581 | 0.012 | 4.000 |
| f | 0.000 | 0.000 | 0.667 | 3.500 |
| g | 2.000 | 1.000 | 0.125 | 3.500 |
| h | 1.414 | 0.707 | 0.343 | 5.600 |
| i | 1.414 | 0.707 | 0.343 | 5.800 |
| j | 4.243 | 2.121 | 0.000 | 6.500 |
| k | 3.000 | 1.500 | 0.021 | 7.333 |
| l | 4.243 | 2.121 | 0.000 | 6.333 |

When the vertex (f) is processed by the Nodal Averaging, the radiosity values of the triangles fbd, fdh, fhi, fig, and fgc are employed as described above. Therefore, it can be said that the values of the vertices (b), (d), (h), (i), (g), and (c) have contributed to the vertex (f). However, in the processing using a filter function such as this, the values of the vertices (a), (c), (j), and (l) are ignored and instead, the contribution of the intensity-value of the vertex (e) is included. That is, intensity change is smoothed not only within geometrical elements or between adjacent geometrical elements but also between geometrical elements which are close to each other in distance. If the node (f) is calculated according to the aforementioned Equation 12, the intensity will reach 4.525. In the Nodal averaging, the value of the triangle bcd is small and accordingly the intensity-value (3.500) of the vertex (f) also becomes smaller. However, since there is no contribution of the vertex (c) and the contribution of the vertex (e) is included, the intensity-value of the vertex (f) is increased after this processing.

Thus, the smoothing effect, which reduces aliasing at the part whose intensity-value change is large, is obtainable without adaptively subdividing a mesh or performing a process such as smoothing a mesh. This processing is not limited to the rendering of the spotlight but it is also applicable when smoothing of the intensity-value of a vertex is executed in a scene whose intensity-value change is large. This processing does not depend upon the geometrical shape of an element and topology. Also, by setting the aforementioned parameters for each object, fine control is possible.

Figure 18:
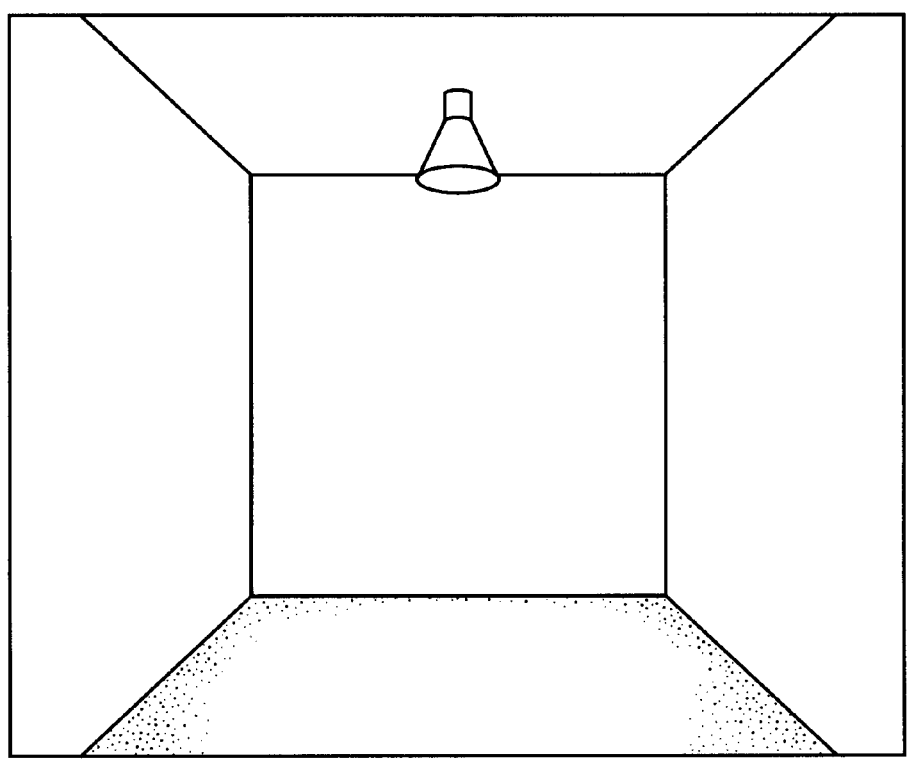
FIG. 18 is a diagram showing a result obtained through the intensity-value filter 13.

The result of this processing, added to the result shown in FIG. 14, is shown in FIG. 18. From FIG. 14 it is easily found that aliasing has been reduced.

(10) Adaptive mesher 9

The adaptive mesher 9 reads the output of the spotlight radiosity processor 11 or intensity-value filter 13. When the change in the intensity-values between adjacent vertices of each element is more than a threshold value specified by AMS_threshold, the adaptive mesher 9 subdivides the surrounding elements which include the adjacent vertices. The adaptive mesher 9 is not operated when the quality parameter AMS_flag is not turned on.

Figure 19:
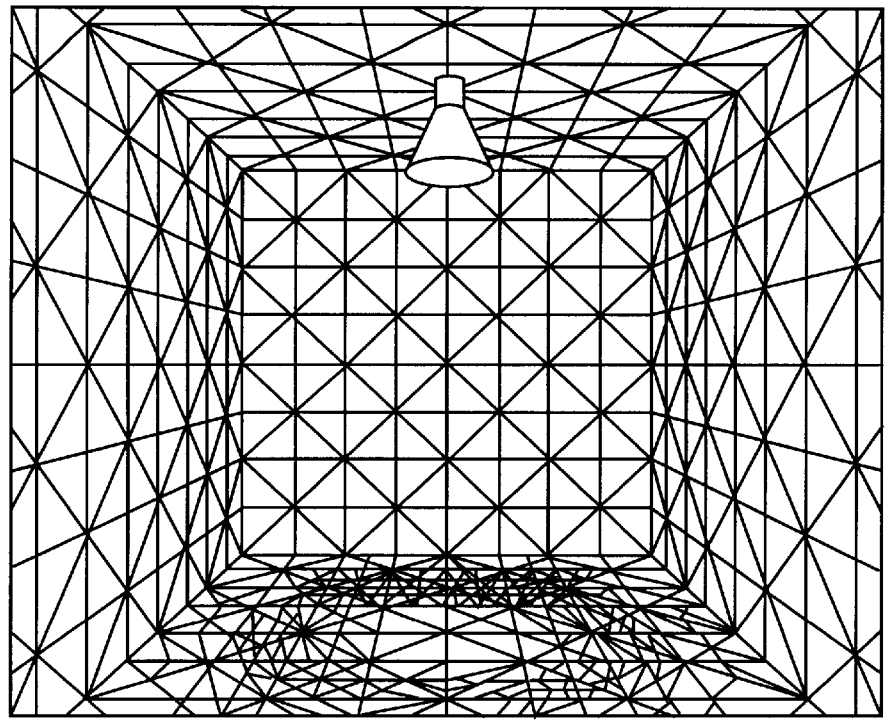
FIG. 19 is a diagram showing the subdivision performed by an adaptive mesher 9.

The process of adaptively subdividing a portion whose intensityvalue change is large is well known in the art, so it will not be described any further. For example, as shown in FIG. 19, the outer edge portion of a floor on which spotlight is irradiated is subdivided. The geometrical data is again output to the spotlight radiosity processor 11 and radiosity calculation is again performed.

Figure 20:
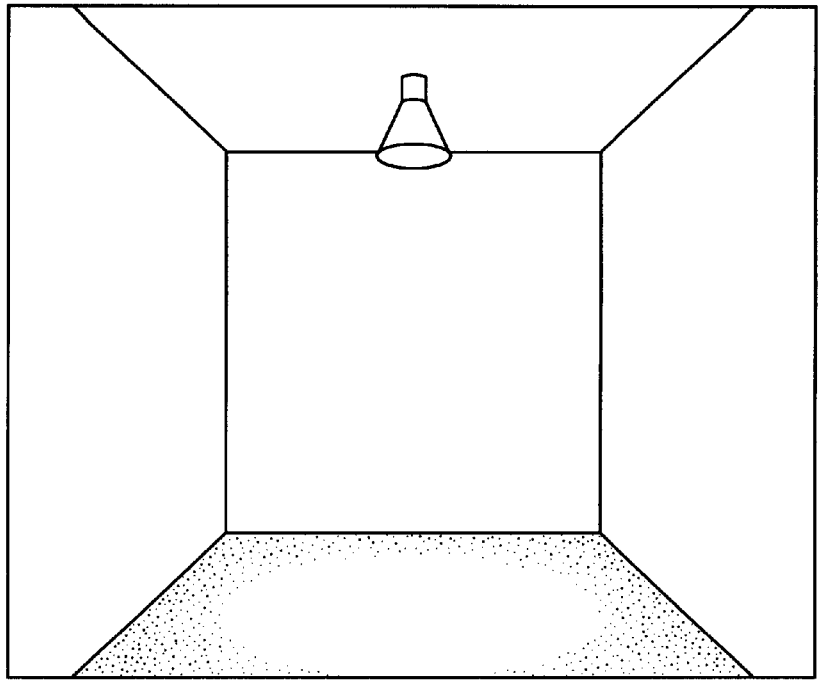
FIG. 20 is a diagram showing the rendering effects in the case where only the adaptive mesher 9 is used.
Figure 21:
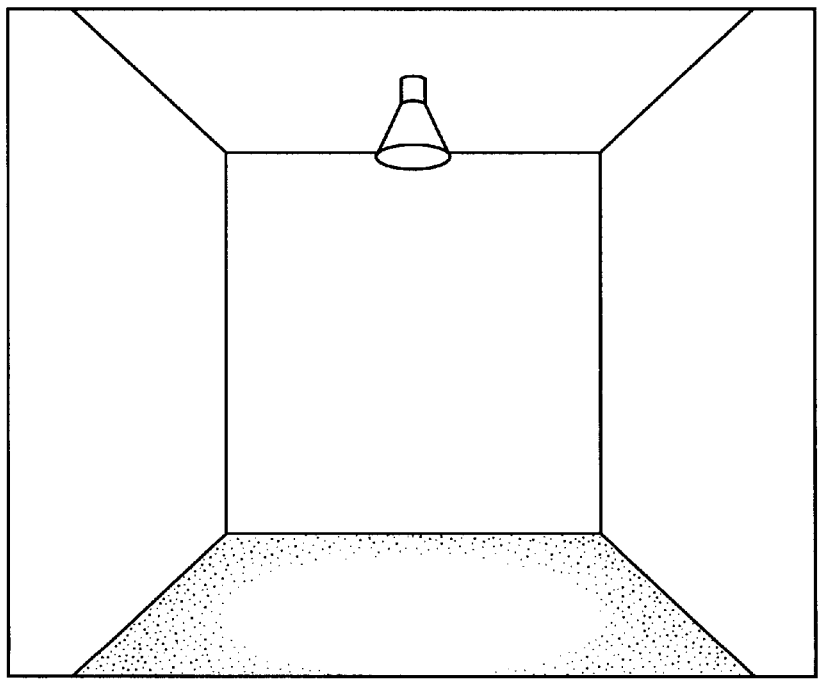
FIG. 21 is a diagram showing the rendering effects in the case where the adaptive mesher 9 and the intensity-value filter 13 are used.

As described above, judgment of a reference threshold value may be performed for the output from the spotlight radiosity processor or for the output from the intensity-value filter 13. Based on the value obtained through the spotlight radiosity processor 11, the mesh is again divided by the adaptive mesher 9. The divided meshes are again processed by the spotlight radiosity processor 11 and Gouraud shading is performed through the intensity-value filter 13. In this way, spotlight effects with a better quality can be rendered. FIG. 20 shows an example where the adaptive mesher is used but the intensity-value filter 13 is not used. FIG. 21 shows an example where all of the processor 11, the mesher 9, and the filter 13 are used. It is found that the aliasing in FIG. 21 has been reduced as compared with FIG. 20.

Figure 22:
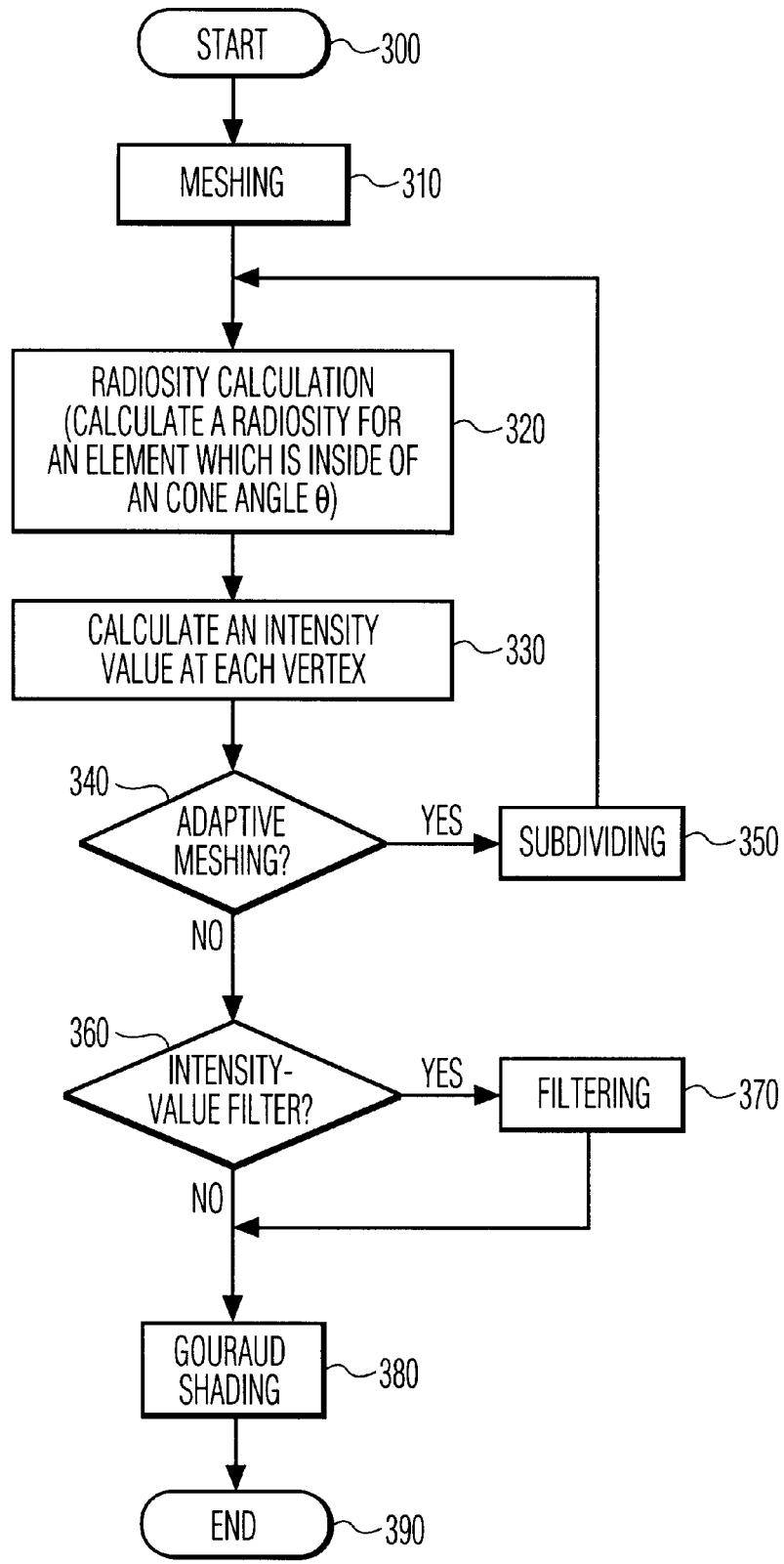
FIG. 22 is a flow chart showing the entire processing.

The aforementioned processing becomes as shown in FIG. 22. The point of the present invention is that radiosity calculation is performed only for elements which are first inside of the cone angle θ. In addition, the characteristic parameters of spotlight, such as a cone angle θ, a delta angle δ, and a degree of attenuation α, are taken into consideration in the radiosity calculation. Furthermore, the intensity-value filter is operated as needed and the intensity-value of each node is smoothed.

Figure 23:
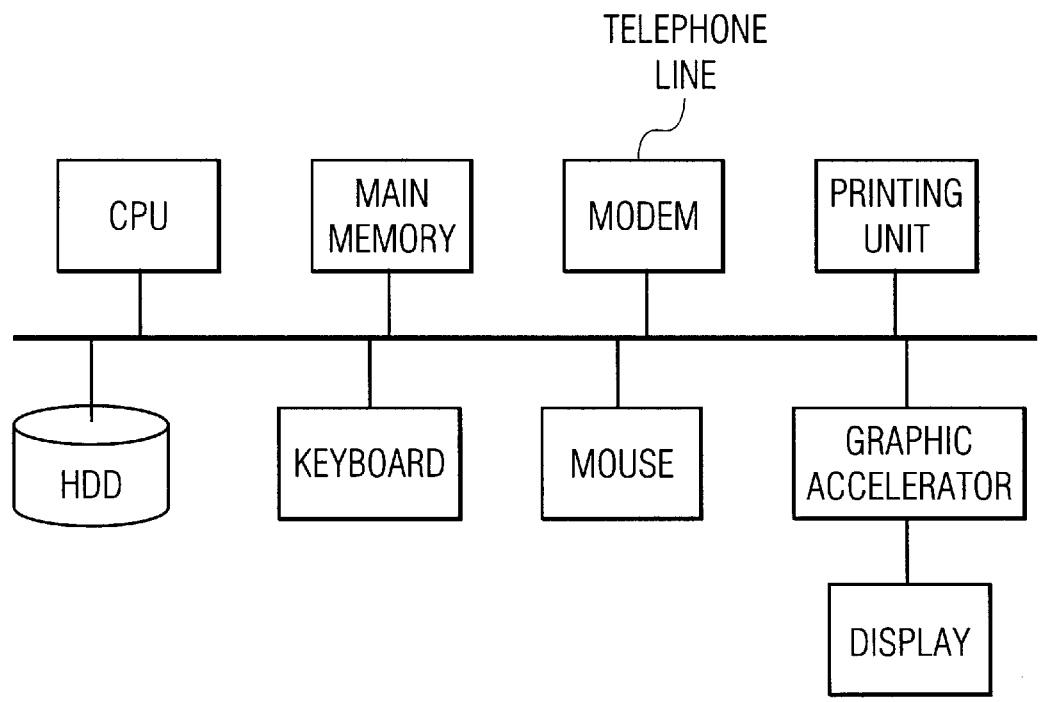
FIG. 23 is a diagram showing an example of a normal computer.

By performing the aforementioned processing, the objectives of the present invention can be achieved. This processing may be carried out by special hardware which corresponds to the functional block shown in FIG. 5. Also, the processing may be carried out by a computer program. Furthermore, the processing may be carried out by a normal computer, such as a computer shown in FIG. 23. Of course, the computer program may be stored in a storage medium, such a CD-ROM or a floppy disk, or in other storage devices.

ADVANTAGES OF THE INVENTION

There can be provided a method which expresses spotlight with a better quality and at high speed under Gouraud shading environment.

Also, there can be provided a method which implements the calculation of the form factor of spotlight at high speeds in a radiosity method.

In addition, there can be provided a handling method suitable for Gouraud shading which is used in a radiosity method.

Furthermore, there can be provided a method which is capable of rendering space which has a boundary whose intensity-value change is large, while reducing aliasing.

We claim:

1. A method for rendering a three-dimensional space which has a spotlight source with a cone angle θ, comprising the steps of:

meshing a surface of an object in said three-dimensional space into a plurality of elements;

calculating a radiosity from said spotlight source for each element which is included inside of said cone angle θ when viewed from said spotlight source;

calculating an intensity-value at each vertex of each element from the radiosity calculated for each element;

performing Gouraud shading by using the intensity-value at each vertex of said each element; and displaying a result of the Gouraud shading onto a display.

2. The method for rendering as set forth in claim 1, wherein said radiosity calculating step includes the steps of:

partitioning an item buffer for said spotlight source in accordance with said cone angle θ; and calculating a form factor for an element which is projected inside of the partitioned item buffer.

3. The method for rendering as set forth in claim 2, wherein said form factor calculating step includes the steps of:

storing an ID and a distance r of an element which is projected on each pixel in said item buffer and is nearest to said spotlight source into each pixel in said item buffer; and summing up a value determined based on a position of each pixel in said item buffer, the stored distance r, and parameters set for said spotlight source with respect to pixels in said item buffer in which an ID of one element is stored.

4. The method for rendering as set forth in claim 1, wherein said intensity-value calculating step includes the step of using an average of radiosities of elements which share one vertex of one element to calculate an intensity-value of said one vertex.

5. The method for rendering as set forth in claim 1, further comprising the steps of:

selecting a certain vertex;

calculating the distance between said certain vertex and another vertex; and weighting by a function of the distance, the intensity-value at each vertex calculated by said intensity-value calculating step and modifying the intensity-value at said certain vertex in accordance with the weighted intensity-values.

6. The method for rendering as set forth in claim 4, further comprising the steps of:

selecting a certain vertex;

calculating the distance between said certain vertex and another vertex; and weighting by a function of the distance, the intensity-value at each vertex calculated by said intensity-value calculating step and modifying the intensity-value at said certain vertex in accordance with the weighted intensity-values.

7. The method for rendering as set forth in claim 1, further comprising the steps of:

judging whether a difference between the intensity-values of one vertex and a vertex adjacent to said one vertex has exceeded a predetermined threshold value;

subdividing elements including said one vertex when said difference has exceeded said predetermined threshold value; and carrying out said radiosity calculating step and the subsequent steps for elements generated as a result of the subdivision.

8. The method for rendering as set forth in claim 5, wherein said function of the distance is a function which attenuates in an isotropic manner with the distance as a parameter.

9. The method for rendering as set forth in claim 6, wherein said function of the distance is a function which attenuates in an isotropic manner with the distance as a parameter.

10. A method for smoothing an intensity-value in a space where a surface of an object is divided into a plurality of elements and said intensity-value is defined at each vertex of each said elements, the method comprising the steps of:

selecting a certain vertex;

calculating a distance between said certain vertex and another vertex; and weighting each intensity-value at each vertex other than said certain vertex by a function of the distance and smoothing the intensity-value at said certain vertex in accordance with the weighted intensity-values.

11. The method for smoothing as set forth in claim 10, wherein said weighting and smoothing step includes the steps of:

summing up said intensity-values at vertices weighted by said function of the distance; and smoothing the intensity-value of said certain vertex in accordance with the summed intensity-values.

12. The method for smoothing as set forth in claim 10, wherein said weighting and smoothing step includes the steps of:

summing up said intensity-values at vertices weighted by said function of the distance; and outputting the summed intensity-values divided by the total value of the weight as an intensity-value of said certain vertex.

13. The method for smoothing as set forth in claim 10, wherein said function of the distance is a piecewise degree three polynomial filter function.

14. The method for smoothing as set forth in claim 10, wherein said function of the distance is a Gaussian filter function.

15. The method for smoothing as set forth in claim 10, wherein said function of the distance is a function which outputs zero when an input distance is more than a predetermined value.

16. An apparatus for rendering a three-dimensional space which has a spotlight source with a cone angle $\theta$, comprising:

a mesher for meshing a surface of an object in said threedimensional space into a plurality of elements;

a radiosity calculating processor for calculating a radiosity from said spotlight source for each element which is included inside of said cone angle $\theta$ when viewed from said spotlight source;

an intensity-value calculating processor for calculating an intensity-value at each vertex of each element from the radiosity calculated for each element;

a renderer for performing Gouraud shading by using the intensity-value at each vertex of said each element; and a display for displaying a result of the Gouraud shading.

17. The apparatus for rendering as set forth in claim 16, wherein said radiosity calculating processor includes:

means for partitioning an item buffer for said spotlight source in accordance with said cone angle $\theta$; and means for calculating a form factor for an element which is projected inside of the partitioned item buffer.

18. The apparatus for rendering as set forth in claim 17, wherein said form factor calculating means includes:

means for storing an ID and a distance r of an element which is projected on each pixel in the item buffer and is nearest to said spotlight source into each pixel in said item buffer; and means for summing up a value determined based on a position of each pixel in said item buffer, the stored distance r, and parameters set for said spotlight source, with respect to pixels in said item buffer in which an ID of one element is stored.

19. The apparatus for rendering as set forth in claim 16, wherein said intensity-value calculating means includes means for using an average of radiosities of elements which share one vertex of one element to calculate an intensity-value of said one vertex.

20. The apparatus for rendering as set forth in claim 16 further comprising:

means for selecting a certain vertex;

means for calculating a distance between said certain vertex and another vertex; and means for weighting by a function of the distance, the intensity-value at each vertex calculated by said intensity-value calculating processor and modifying the intensity-value at said certain vertex in accordance with the weighted intensity-values.

21. The apparatus for rendering as set forth in claim 16, further comprising:
    means for judging whether a difference between the intensity-values of one vertex and a vertex adjacent to said one vertex has exceeded a predetermined threshold value;
    means for subdividing elements including said one vertex when said difference has exceeded said predetermined threshold value; and
    said radiosity calculating processors being operated for elements generated as a result of the subdivision.

22. An apparatus for smoothing an intensity-value in a space where a surface of an object is divided into a plurality of elements and said intensity-value is defined at each vertex of each said elements, comprising:
    means for selecting a certain vertex;
    means for calculating a distance between said certain vertex and another vertex; and
    means for weighting each intensity-value at each vertex other than said certain vertex by a function of the distance and smoothing the intensity-value at said certain vertex in accordance with the weighted intensity-values.

23. The apparatus for smoothing as set forth in claim 22, wherein said weighting and smoothing means includes:
    means for summing up said intensity-values at vertices weighted by said function of the distance; and
    means for outputting the summed intensity-values divided by the total value of the weight as an intensity-value of said certain vertex.

24. The apparatus for smoothing as set forth in claim 22, wherein said function of the distance is a function which attenuates in an isotropic manner with the distance as a parameter.

25. A storage device including a program code for causing a computer to render a three-dimensional space which has a spotlight source with a cone angle θ, said program code comprising:
    a mesher program code for causing said computer to mesh a surface of an object in said three-dimensional space into a plurality of elements;
    a radiosity calculation program code for causing said computer to calculate a radiosity from said spotlight source for each element which is included inside of said cone angle θ when viewed from said spotlight source;
    an intensity-value calculation program code for causing said computer to calculate an intensity-value at each vertex of each element from the radiosity calculated for each element; and
    a renderer program code for causing said computer to perform Gouraud shading by using the intensity-value at each vertex of said each element.

26. The storage device as set forth in claim 25, wherein said radiosity calculation program code includes:
    a program code for causing said computer to partition an item buffer for said spotlight source in accordance with said cone angle θ; and
    a program code for causing said computer to calculate a form factor for an element which is projected inside of the partitioned item buffer.

27. The storage device as set forth in claim 25, wherein said program code for causing to calculate the form factor includes:
    a program code for causing said computer to store an ID and a distance r of an element which is projected in each pixel in said item buffer and is nearest to said spotlight source into each pixel in said item buffer; and
    a program code for causing said computer to sum up a value determined based on a position of each pixel in said item buffer, the stored distance r, and parameters set for said spotlight source, with respect to pixels in said item buffer in which an ID of one element is stored.

28. The storage device as set forth in claim 25, wherein said intensity-value calculation program code includes a program code for causing said computer to use an average of radiosities of elements which share one vertex of one element to calculate an intensity-value of said one vertex.

29. The storage device as set forth in claim 25, further comprising:
    a program code for causing said computer to select a certain vertex;
    a program code for causing said computer to calculate a distance between said certain vertex and another vertex; and
    a program code for causing said computer to weight by a function of the distance, the intensity-value at each vertex calculated by said intensity-value calculation program code and said computer and to modify the intensity-value at said certain vertex in accordance with the weighted intensity-values.

30. The storage device as set forth in claim 28, further comprising:
    a program code for causing said computer to select a certain vertex;
    a program code for causing said computer to calculate a distance between said certain vertex and another vertex; and
    a program code for causing said computer to weight by a function of the distance, the intensity-value at each vertex calculated by said intensity-value calculation program code and said computer and to modify the intensity-value at said certain vertex in accordance with the weighted intensity-values.

31. The storage device as set forth in claim 29, further comprising:
    a program code for causing said computer to judge whether a difference between the intensity-values of one vertex and a vertex adjacent to said one vertex has exceeded a predetermined threshold value;
    a program code for causing said computer to subdivide the element including said one vertex when said difference has exceeded said predetermined threshold value; and
    a program code for causing said computer to output elements, generated as a result of the subdivision, to said radiosity calculation program code.

32. The storage device as set forth in claim 30, further comprising:
    a program code for causing said computer to judge whether a difference between the intensity-values of one vertex and a vertex adjacent to said one vertex has exceeded a predetermined threshold value;
    a program code for causing said computer to subdivide the element including said one vertex when said difference has exceeded said predetermined threshold value; and
    a program code for causing said computer to output elements, generated as a result of the subdivision, to said radiosity calculation program code.

33. A storage device including a program code for causing a computer to smooth an intensity-value in a space where a surface of an object is divided into a plurality of elements and said intensity-value is defined at each vertex of each said elements, said program code comprising:

a program code for causing said computer to select a certain vertex;

a program code for causing said computer to calculate the distance between said certain vertex and another vertex; and a program code for causing said computer to weight each intensity-value at each vertex other than said certain vertex by a function of the distance and to smooth the intensity-value at said certain vertex in accordance with the weighted intensity-values.

34. The storage device as set forth in claim 33, wherein said program code for causing to weight and smooth includes:

a program code for causing said computer to sum up said intensity-values at vertices weighted by said function of the distance; and a program code for causing said computer to smooth the intensity-value at said certain vertex in accordance with the summed intensity-values.

35. The storage device as set forth in claim 33, wherein said function of the distance is a function which outputs zero when an input distance is more than a predetermined value.

36. A method for calculating an intensity-value at each vertex of a plurality of elements which are generated by meshing a surface of an object in a three-dimensional space which has a spotlight source with a cone angle e, the method comprising the steps of:

calculating a radiosity from said spotlight source for each element which is included inside of said cone angle e when viewed from said spotlight source; and calculating an intensity-value at each vertex of each element from the radiosity calculated for each element.

37. A storage device including a program code for causing a computer to calculate an intensity-value at each vertex of a plurality of elements which are generated by meshing a surface of an object in a three-dimensional space which has a spotlight source with a cone angle $\theta$, said program code comprising:

a radiosity calculation program code for causing said computer to calculate a radiosity from said spotlight source for each element which is included inside of said cone angle $\theta$ when viewed from said spotlight source; and an intensity-value calculation program code for causing said computer to calculate an intensity-value at each vertex of each element from the radiosity calculated for each element.

* * * * *